United States Patent [19]
Adams

[11] Patent Number: 5,993,273
[45] Date of Patent: Nov. 30, 1999

[54] AMPHIBIOUS ALL TERRAIN VEHICLE

[76] Inventor: Curtis D. Adams, 6224 Bell Road Ct., Montgomery, Ala. 36117

[21] Appl. No.: 09/042,091

[22] Filed: Mar. 13, 1998

[51] Int. Cl.⁶ .................................................. B63H 21/12
[52] U.S. Cl. ........................ 440/5; 440/12.51; 440/12.57; 440/12.7
[58] Field of Search ............................... 440/12.5, 12.51, 440/12.57, 12.66, 12.67, 12.68, 12.69, 12.7, 5; 180/308, 306, 24.07

[56] References Cited

U.S. PATENT DOCUMENTS

| | | | |
|---|---|---|---|
| 2,361,098 | 10/1944 | Higby | 180/308 |
| 2,923,268 | 2/1960 | Fletcher et al. | 440/12.66 |
| 3,088,531 | 5/1963 | Howard | 180/308 |
| 3,188,996 | 6/1965 | Thompson | 180/306 |
| 3,351,147 | 11/1967 | Williamson | 180/308 |
| 3,385,255 | 5/1968 | Raymond et al. | |
| 3,435,798 | 4/1969 | Rieli | 440/12.66 |
| 3,444,837 | 5/1969 | Donofrio | |
| 3,450,089 | 6/1969 | Lippincott | |
| 4,063,608 | 12/1977 | Sullivan | 180/308 |
| 4,457,525 | 7/1984 | Tanaka et al. | |
| 4,570,741 | 2/1986 | McCoy | |
| 4,796,901 | 1/1989 | Furukawa | |
| 4,821,825 | 4/1989 | Somerton-Rayner | |
| 4,842,326 | 6/1989 | DiVito | |
| 4,907,735 | 3/1990 | Ushioda et al. | |
| 5,117,936 | 6/1992 | Nakamura et al. | |
| 5,466,034 | 11/1995 | Savage | |
| 5,480,189 | 1/1996 | Davies et al. | |

FOREIGN PATENT DOCUMENTS

| | | |
|---|---|---|
| 120859 | 2/1947 | Australia . |
| 6-166342 | 6/1994 | Japan . |
| 2 002 884 | 2/1979 | United Kingdom . |

*Primary Examiner*—Sherman Basinger
*Attorney, Agent, or Firm*—Richard C. Litman

[57] ABSTRACT

An improved amphibious all terrain vehicle having a subtantially rectangular body or shell and is constructed of a light-weight durable metallic material. A combustion gas engine is coupled to a dual hydraulic pump system which is centrally mounted within the length direction of the cavity for easy access and removal for repairs. An oil tank serves also as a seat base and is disposed within a central portion of the shell. Six-independent wheel motors are symmetrically disposed in series, three on each side of the shell and are plumbed in series for ground based mobility respectively. The wheels coordinate with a propeller disposed in the rear for amphibious propulsion. A fan is mounted on the under side of a front hood, near a dual lever, and switch controls for respective propulsion systems, and night-lights mounted on the hood respectively.

15 Claims, 4 Drawing Sheets

AMPHIBIOUS ALL TERRAIN VEHICLE

BACKGROUND OF THE INVENTION

1. Field of the Invention

The present invention relates generally to motor vehicles. More specifically, the invention is a six-wheel independent drive amphibious all terrain vehicle which operates by a dual pump hydraulic system that delivers power to the wheels on both sides of the vehicle. The power of the vehicle is generated and translated to the system by an internal combustion gas engine.

2. Description of the Related Art

Various all terrain vehicles have been devised as utility vehicles for access to land areas having marsh and rugged terrains. The problem, however, with the conventional all terrain vehicles is that most include the complexities of gear and pulley systems which are highly prone to failure as a means for translating power from an engine to other respective moving parts, namely the wheels and other propulsion systems. For example, U.S. Pat. No. 3,385,255 issued to Raymond et al. discloses a track type amphibious vehicle which utilizes conduits or fluid lines for transmitting fluid power to a link chain and chain and sprocket drive which subsequently transmits power to the wheels. The amphibious all terrain vehicle of the instant invention does not require a chain and sprocket drive nor tracks as herein described.

U.S. Pat. No. 3,444,837 issued to Donofrio discloses a utility vehicle having structural features directed to a self supporting powered chassis comprising a clutch mechanism which functions by the principal use of planetary gear systems. In addition, the wheels are driven by a series of belts. This system of belts is completely different from that of the instant invention. U.S. Pat. No. 3,450,089 issued to Lippincott discloses similar gear features for transmitting power to a four-wheel vehicle. The power is transmitted through an axle laterally disposed across both wheels. This vehicle has weight requirements beyond that specified by the instant invention, due to the mandatory axles for each set of wheels. U.S. Pat. No. 4,821,825 issued to Somerton-Rayner also discloses similar structural requirements to that of Lippincott.

Other structural features which are generally relevant to the instant invention are represented in the following U.S. Pat. Nos. by Tanaka et al. (4,457,525), Furukawa (4,796,901), Divito (4,842,326), Ushioda et al. (4,907,735), Savage (5,466,034) and Davies et al. (5,480,189) . These particular patents disclose general features related to the frame structure of conventional all terrain vehicles including elements such as removable panels. However, there is no teaching nor suggestion for a six-wheel independent drive vehicle as herein described.

U.S. Pat. No. 5,117,936 issued to Nakamura discloses a vehicle propelling apparatus which converts between two wheel and four wheel drive systems, utilizing a hydraulic propulsion system including the requirement for a differential between the front right and left wheels. The British Patent document (GB 2 002 884) by Friedrich discloses similar features to the vehicle taught by Nakumura, however, the system requires a complex clutch and valve system for free wheeling and avoiding cavitation respectively. The amphibious all terrain vehicle according to the instant invention is completely different in that a differential between the front right and left tires and/or the requirement for the respective clutch system at least are not required as herein described. Other Foreign Patent documents such as the Australian document (AU 120,859) and the Japanese document (JP 6 166,342) have been cited as generally relevant to the instant invention.

The amphibious all terrain vehicle according to the instant invention is different to that of the prior and related art in that it is an improved light-weight utility vehicle which operates on a unique six-wheel independent drive system which reduces mechanical failure attributed to complex clutch and valve systems.

Therefore, none of the above inventions and patents, taken either singularly or in combination, is seen to describe the instant invention as claimed. Thus, an amphibious all terrain vehicle solving the aforementioned problems is desired.

SUMMARY OF THE INVENTION

The amphibious all terrain vehicle according to the invention has a subtantially rectangular body or shell and is constructed of a light-weight durable metallic material. A combustion gas engine coupled to a dual hydraulic pump system is centrally mounted within the length direction of the cavity for easy access and removal for repairs. An oil tank structure disposed within a central portion of the shell double as both a seat base and oil reservoir. Six-independent wheel motors are symmetrically disposed on the sides of the vehicle. They are grouped three on each side of the shell, and are arranged in series for ground based mobility respectively. The hydraulic system for the wheels operates independent, but in coordination with the hydraulic system for a propeller disposed in the rear for amphibious propulsion. A fan is mounted on the under side of a front hood near dual lever and switch controls for the respective propulsion systems and night-lights mounted thereto.

Accordingly, it is a principal object of the invention to provide an improved amphibious all terrain vehicle which has utility in both amphibious and land-based applications.

It is another object of the invention to provide an amphibious all terrain vehicle which is simple to operate.

It is a further object of the invention to provide an amphibious all terrain vehicle which is durable and light-weight.

Still another object of the invention is to provide an amphibious all terrain vehicle which is not prone to mechanical failures related to complex gear and clutch systems at least.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENT(S)

Figure 1:
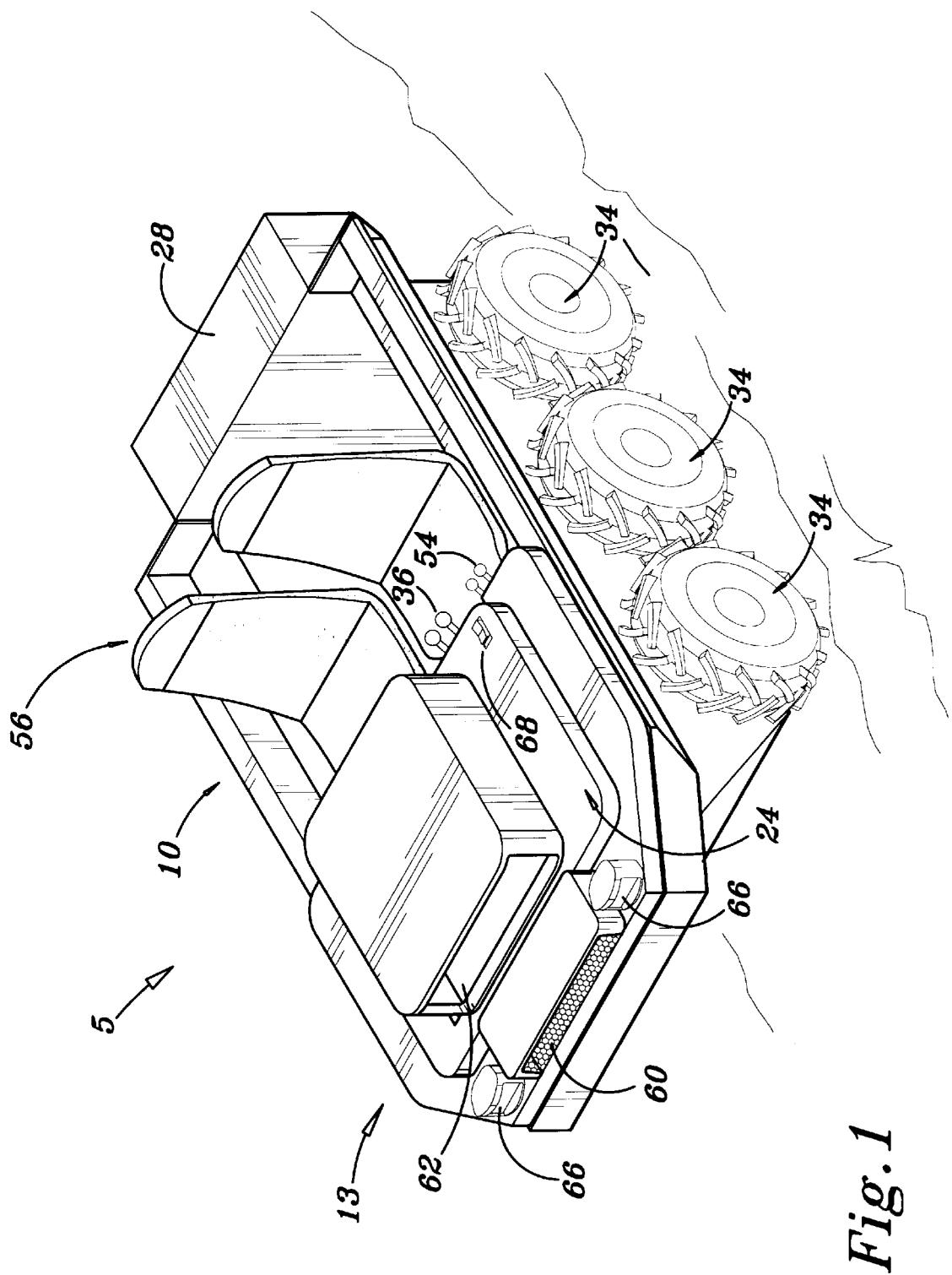
FIG. 1 is an environmental perspective view of the amphibious all terrain vehicle on land according to the present invention.
Figure 2:
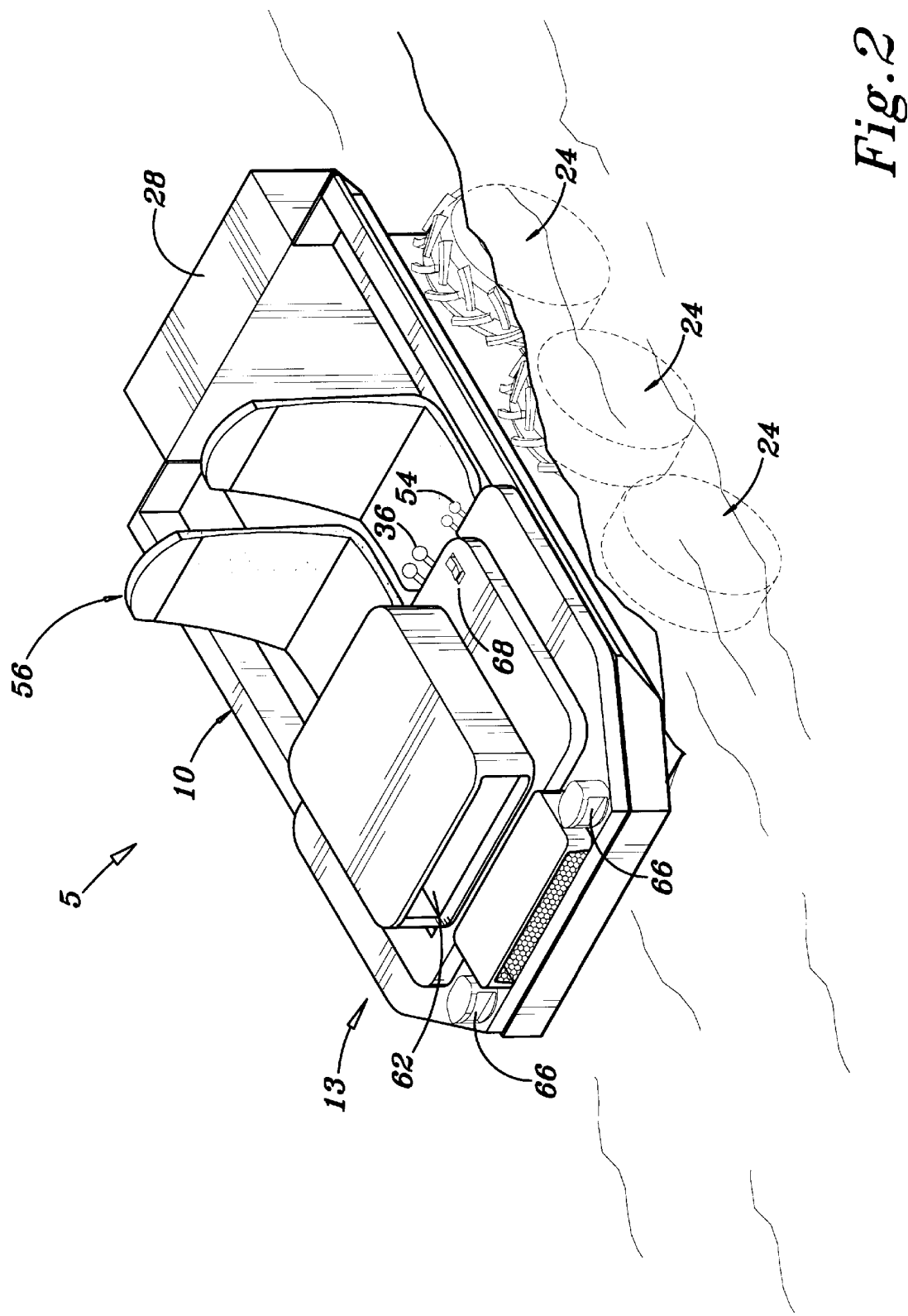
FIG. 2 is an environmental perspective view of the amphibious all terrain vehicle in water according to the invention.

The present invention is directed to an improved amphibious all terrain vehicle for utility in both land-based and amphibious applications. The preferred embodiment of the present invention is depicted in FIGS. 1–4, and is generally referenced by numeral 5.

As best seen in FIG. 1–4, the improved amphibious all terrain vehicle comprises a substantially rectangular shell 10 for housing an engine 12, pump system 14, a plurality of reservoirs 26 and 28, and dual gauges 20 and 22 for monitoring pressure and temperature, respectively. The shell 10 further comprises a multi-tiered hood 24. The hood 24 consist of external and internal surface portions 24a and 24b respectively. Immediately below the hood 24, are the mounting brackets (not shown), and truss structure T for the engine 12. The engine can be secured or mounted by means of mechanical fasteners or bolts. Other items, such as rubber engine mounts can be used to absorb or dampen any vibrations produce by the engine 12 and transmitted throughout the shell 10.

An oil cooler 25 is centrally disposed within an internal surface portion 24b of the hood 13. The oil cooler 25 further comprises first and second hose connectors 25a and 25b for connecting oil lines 11 from the pump system 14 and an oil reservoir 26. Connector bi returns the cooled oil back to the tank via connection 25c located at the rear portion of the oil tank or reservoir 26. Another reservoir or tank 28 is a fuel tank for a two cylinder combustion gas engine which delivers at least 20 horse power to the hydraulic pump system 14. The pump system 14 is a dual pump system which provides independent hydraulic power to three hydraulic motors disposed on a bottom portion of the shell along first and a second respective sides 30 and 32 of the shell 10.

A total of six hydraulic motors (30a, 30b, 30c, 32a, 32b, and 32c) are mounted within the bottom portion of the shell 10 for attachment to wide traction balloon type tires 34. The unique feature of the instant invention is that the tires on each respective side 30 and 32 of the shell 10 are independent of each other, and are connected in series for continuous hydraulic power transmitted to the respective tires 34 for mobility. The motors as labeled above are symmetrically arranged about the engine in series as diagrammatically illustrated in FIGS. 3 and 4 at least.

Each motor further comprises connecting shafts for mechanically fastening and providing the means for transmitting rotational power to the respective tires 34. The pump system 14 is coupled to the engine 12 for transmitting power through hydraulic lines or hoses 11 to the respective plurality of motors. The pump system further includes dual levers 36 for controlling the rotation of the tires and the subsequent movement of the vehicle according to the instant invention. Pressure and temperature gauges 20 and 22 monitors the oil according to desired levels. In the instant invention a pressure corresponding to a temperature of 170 degrees fahrenheit is preferred for a 20 horsepower engine. In the event additional power is preferred by one skilled in the relevant art, the temperature and pressure level will change according to preference, but would require only routine skill in the art to provide. In any event, the temperature and pressure is maintained within the oil lines 11 as preferred by the instant invention.

Figure 3:
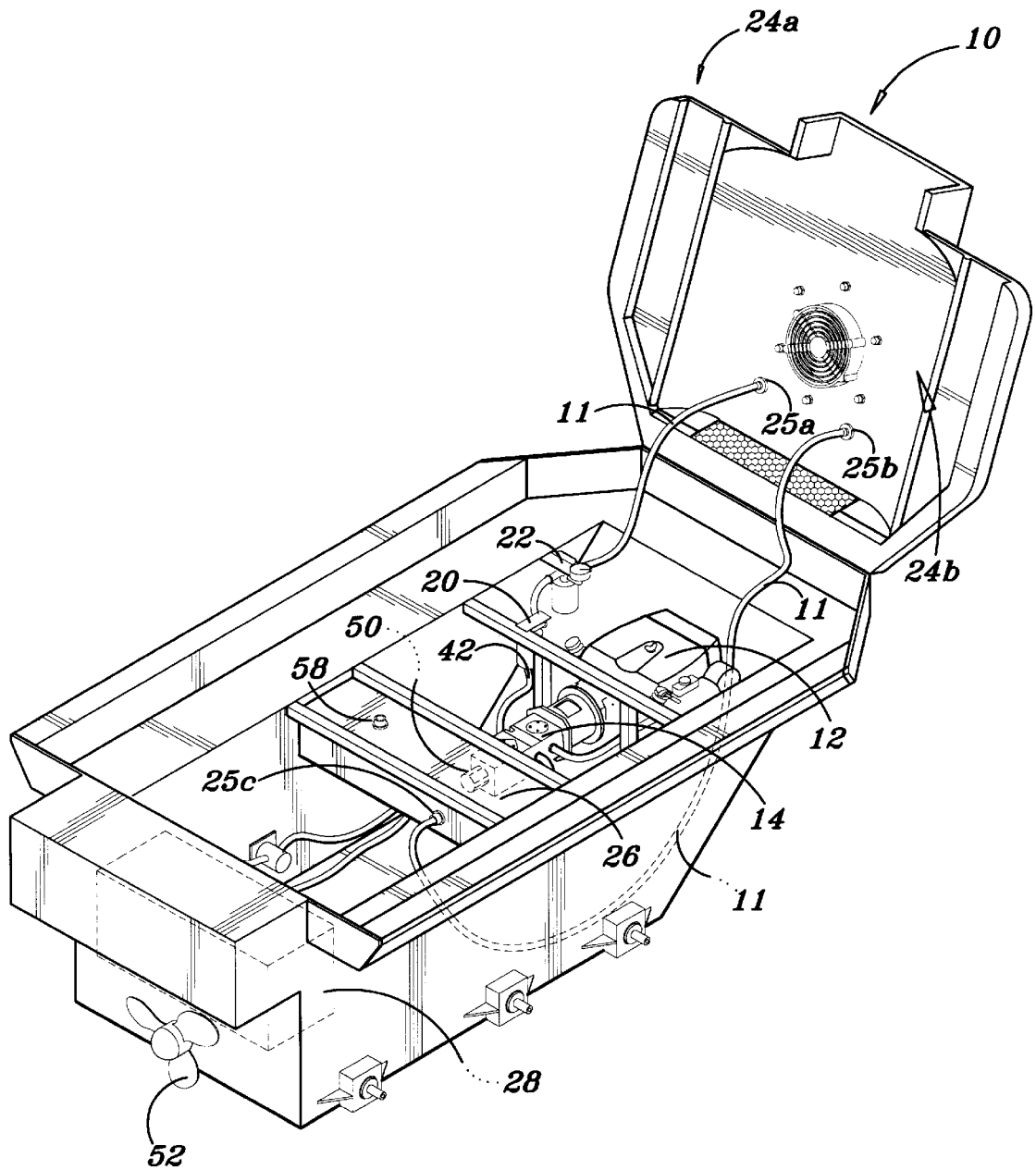
FIG. 3 is a perspective view of the internal oil cooling and propulsion systems, including the external wheel based connections according to the invention.
Figure 4:
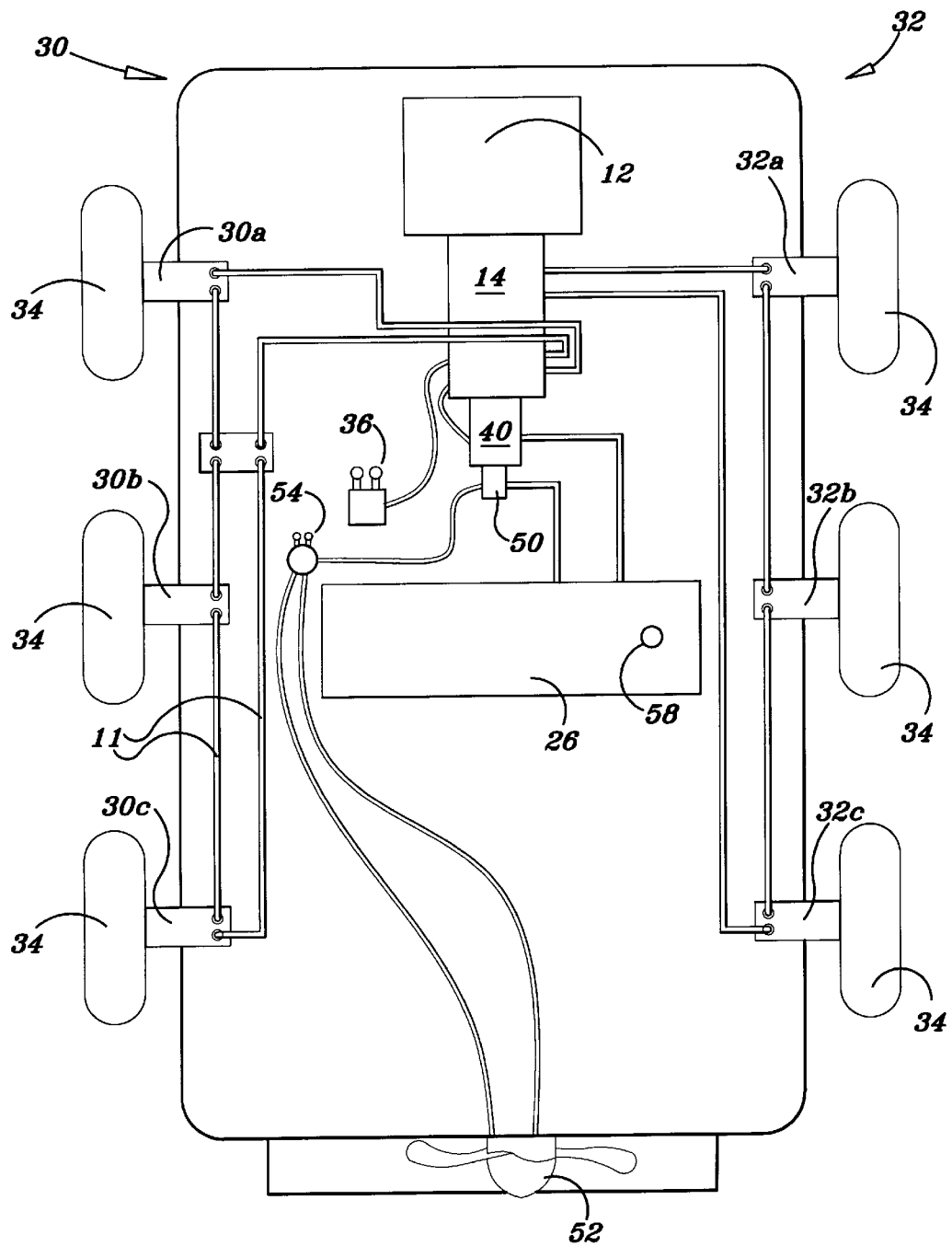
FIG. 4 is an oil transport and connection diagram according to the amphibious all terrain vehicle according to the invention.

As illustrated in FIG. 3, by phantom or dotted lines, a charge pump 40 is coupled to the pump system 14 which is located below the oil reservoir 2 for delivering oil to the pump system 14, and the respective hydraulic motors connected in series on first and second sides 30 and 32. The shell 10 is preferably constructed of an aluminum material, but can include other lighter materials, such as composite plastic materials. Aluminum has the advantage of providing the needed structural rigidity without being prone to failure associated with the long term effects of metal fatigue.

As seen in FIG. 3, the hydraulic motors for the tires 34 are symmetrically disposed in series near the base or bottom of the shell 10. The pump system 14 further includes a case drain 42 for delivering oil to said first hose connector 25a via respective pressure and temperature gauges 20 and 22. A second hose connector 25b provides a means for returning cooled oil to the oil reservoir 26. A hose line 11 illustrates the path from the second hose connector 25b to the oil reservoir 26 in dotted lines. A fuel tank or reservoir 28 is mounted on the rear portion of the shell 10 opposite the hood 13. The fuel tank is adapted to deliver gasoline to the engine 12 (not shown).

Another unique feature of the improved amphibious all terrain vehicle according to invention, is the use of an auxiliary hydraulic pump system 50, schematically illustrated in FIG. 3 as a cylindrical shaped element in dotted lines. The hydraulic system (partially shown) will provide independent hydraulic power to a propeller 52 disposed below the fuel tank 28 as similarly disclosed for the wheel motors. Separate lever controls 54 are mounted on an external surface portion of the hood 13 in close proximity to the wheel control levers 36. Other means for propulsion can be used instead of the propeller, such as a hydraulically controlled paddle wheel (not shown). This type of system can be similarly disposed in the rear of the shell 10 with spatial adjustments made from the rear of the shell 10 and towards the rear of the seat(s) or oil reservoir as recited above.

A single or dual seat configuration 56 can be included in the instant invention with safety belts and gear optionally provided. The respective seat(s) is(are) hingedly mounted on top of the oil tank for access to a the oil cap 58. Other special features of the instant invention include a rectangular vent 60 and air duct 62 for the oil cooling system disposed within the external surface portion 24a of the hood 24. The air duct 62 receives ambient air for cooling the oil as desired. A fan 25 also provide the passing of ambient air according to a required flow rate to maintain the preferred temperature of 170 degrees fahrenheit. The fan 25 is electrically connected to a battery source (not shown). Head lights 66 are also included in the instant invention, wherein the head lights 66 are disposed on a portion of an external surface portion of the hood, and are controlled by a switch 68 disposed near the dual levers via a common power source. With respect to the electrical arrangements of these features, it is considered to require only routine skill in the art to provide the necessary electrical connections for these and including any additional features as desired.

It is to be understood that the present invention is not limited to the embodiments described above, but encompasses any and all embodiments within the scope of the following claims.

I claim:

1. An improved amphibious all terrain vehicle comprising:

a substantially rectangular shell for housing an engine, pump system, a plurality of reservoirs, and dual gauges;

said shell further comprises a multi-tiered hood; the hood having an external and internal surface portion;

an oil cooler is centrally disposed within the internal surface portion of the hood; said oil cooler further comprises first and second hose connectors for connecting oil lines from the pump system and one of said plurality of reservoirs;

a plurality of hydraulic motors are mounted within a bottom portion of said shell for attachment to tires; said motors are disposed at a bottom portion of the shell at first and second sides; said motors are symmetrically arranged in series;

the motors further comprise connecting shafts for mechanically fastening and rotating the tires;

the pump system is coupled to the engine for transmitting power through hydraulic lines to the respective plurality of motors; said pump system further comprises dual levers for controlling the rotation of the tires; said dual gauges monitors pressure and temperature within the lines;

a charge pump is coupled to the pump system and near said one of said plurality of reservoirs for delivering oil to the pump system; said system is adapted to deliver and receive oil to said first and second sides of the respective plurality of motors symmetrically disposed in series;

the pump system further comprises a case drain for delivering oil to said first hose connector, with said second hose connector delivering said oil from the case drain to said one of said plurality of reservoirs;

the other reservoir is adapted for delivering gas to the engine, the shell further comprising a mounting means for mounting the engine to the shell.

2. The improved amphibious all terrain vehicle according to claim 1, further comprising an auxiliary hydraulic pump system for a propeller.

3. The improved amphibious all terrain vehicle according to claim 2, wherein said propeller is disposed in a rear portion of said shell opposite to the hood and below said other plurality of said reservoirs.

4. The improved amphibious all terrain vehicle according to claim 2, wherein said pump system further comprise dual levers for controlling the power delivered from said auxiliary pump to propeller.

5. The improved amphibious all terrain vehicle according to claim 4, wherein said levers are mounted to a portion of the external surface of the hood.

6. The improved amphibious all terrain vehicle according to claim 1, further comprising a seat mounted to a top portion of said one of said plurality of reservoirs.

7. The improved amphibious all terrain vehicle according to claim 1, wherein said shell is an aluminum shell.

8. The improved amphibious all terrain vehicle according to claim 1, wherein said hood further comprise a rectangular vent for the oil system.

9. The improved amphibious all terrain vehicle according to claim 1, wherein said hood further comprise a substantially air duct for receiving ambient air for the oil cooling system.

10. The improved amphibious all terrain vehicle according to claim 1, wherein said oil cooling system is a electronic fan.

11. The improved amphibious all terrain vehicle according to claim 1, further comprising head lights disposed on a portion of the external surface portion of the hood.

12. The improved amphibious all terrain vehicle according to claim 11, wherein said head lights are controlled by a switch disposed mounted near the dual levers.

13. The improved amphibious all terrain vehicle according to claim 1, wherein said tires are wide traction balloon type tires for rugged terrains.

14. The improved amphibious all terrain vehicle according to claim 1, wherein the engine is a combustion gas engine.

15. The improved amphibious all terrain vehicle according to claim 1, wherein the pump system is a hydraulic dual pump system.

* * * * *